(12) United States Patent
Shidara et al.

(10) Patent No.: US 6,467,456 B2
(45) Date of Patent: Oct. 22, 2002

(54) ENGINE IGNITION TIMING CONTROL SYSTEM FOR OUTBOARD MOTORS

(75) Inventors: Sadafumi Shidara; Kazuhiro Satoh, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/855,655

(22) Filed: May 16, 2001

(65) Prior Publication Data

US 2001/0045204 A1 Nov. 29, 2001

(30) Foreign Application Priority Data

May 19, 2000 (JP) ........................................ 2000-147662

(51) Int. Cl.[7] ................................................ F02P 5/145
(52) U.S. Cl. ............................... 123/406.54; 123/179.5; 123/182.1; 123/406.59
(58) Field of Search .................... 123/179.5, 182.1, 123/406.59, 406.53, 406.54

(56) References Cited

U.S. PATENT DOCUMENTS 5,027,771 A * 7/1991 Daikoku et al. ....... 123/406.54
5,197,430 A * 3/1993 Hoshiba et al. ........ 123/406.51
6,314,938 B1 * 11/2001 McCreery et al. ....... 123/179.5
6,334,417 B1 * 1/2002 Salber et al. ............ 123/179.5

FOREIGN PATENT DOCUMENTS

JP              63-2565            1/1988

* cited by examiner

Primary Examiner—Erick Solis
(74) Attorney, Agent, or Firm—Arent Fox Kintner Plotkin & Kahn, PLLC (57) ABSTRACT

An engine ignition timing control system for outboard motor having a propeller connected to the engine to be rotated and mounted on a boat such that the boat is propelled forward or backward. The engine is equipped with a decompression mechanism and is started by a recoil starter. In the system, at the time of engine starting, the ignition timing is set to a predetermined crank angle until the detected engine speed exceeds a first prescribed engine speed, while it is set to a value obtained by retrieving a table by at least the detected engine speed after the detected engine speed exceeds the first prescribed engine speed. And, the ignition timing is advanced until the detected engine speed is equal to or greater than a second prescribed value and is then returned to the retrieved value. With this, the engine speed can be reliably increased at starting, without need for a throttle opener or air-fuel ratio enrichment, thereby enhancing engine starting performance.

11 Claims, 5 Drawing Sheets

ENGINE IGNITION TIMING CONTROL SYSTEM FOR OUTBOARD MOTORS

BACKGROUND OF THE INVENTION

1. Field of the Invention

This invention relates to an engine ignition timing control system for outboard motors.

2. Description of the Prior Art

In an outboard motor, particularly small, portable-class outboard motor, its internal combustion engine is frequently not equipped with a self-starter but instead with a recoil starter comprising of a rope wrapped around a flywheel that the operator pulls to start the engine. In this case, the engine is often equipped with a decompression mechanism (device for automatically lowering starting load) in order to reduce the recoil load and improve operability.

As taught by Japanese Utility Model Publication No. Sho 63(1988)-2565, for instance, the decompression mechanism is typically composed chiefly of a weight attached to an engine camshaft, a valve release member attached to the weight that when in the operating position drives the intake/exhaust valves in the opening direction, and biasing means (spring) that biases the weight against the centrifugal force acting on the camshaft so as to locate the valve release member in the operating position. In other words, the decompression mechanism makes the pistons easier to move and reduces recoil load by opening the valves slightly when rotational speed is slow enough for the spring to overcome the centrifugal force.

Although the decompression mechanism reduces burden on the operator, its operating principle of opening the intake/exhaust valves, even though only slightly, degrades engine starting performance. When a decompression mechanism is provided, therefore, the practice is generally to also install a start throttle opener or to enrich the air-fuel ratio markedly at engine starting.

Provision of a start throttle opener is, however, disadvantageous because it adds to structural complexity and thus cost, and also degrades space utilization. On the other hand, marked enrichment of the air-fuel ratio at engine starting is undesirable because it impacts the environment by lowering fuel economy, degrading emission and increasing exhaust gas fume smell, and also because it shortens the service life of the ignition plugs and is liable to cause loss of idling speed stability.

SUMMARY OF THE INVENTION

An object of this invention is therefore to overcome the aforesaid drawbacks of the prior art by providing an engine ignition timing control system for outboard motors that can control ignition timing to enhance engine starting performance, without need for a start throttle opener or air-fuel ratio enrichment, and is structurally simple.

For realizing this object, a first aspect of this invention provides a system for controlling ignition timing for an internal combustion engine, at starting, of an outboard motor having a propeller connected to the engine to be rotated, the outboard motor being to be mounted on a boat such that the boat is propelled forward or backward, comprising: engine speed detecting means for detecting speed of the engine; ignition timing setting means for setting the ignition timing of the engine to a predetermined crank angle until the detected engine speed exceeds a first prescribed engine speed, and for setting the ignition timing of the engine to a value obtained by retrieving a predetermined characteristic by at least the detected engine speed after the detected engine speed exceeds the first prescribed engine speed; ignition timing adjusting means for adjusting the ignition timing in a direction advanced than the retrieved value until the detected engine speed becomes equal to or greater than a second prescribed speed after the detected engine speed has exceeded the first prescribed engine speed; and ignition means for igniting air-fuel mixture in the engine based on at least one of the set ignition timing and the adjusted ignition timing.

DETAILED DESCRIPTION OF THE PREFERRED EMBODIMENT

An engine ignition timing control system for outboard motors according to an embodiment of this invention will now be explained with reference to the attached drawings.

Figure 1:
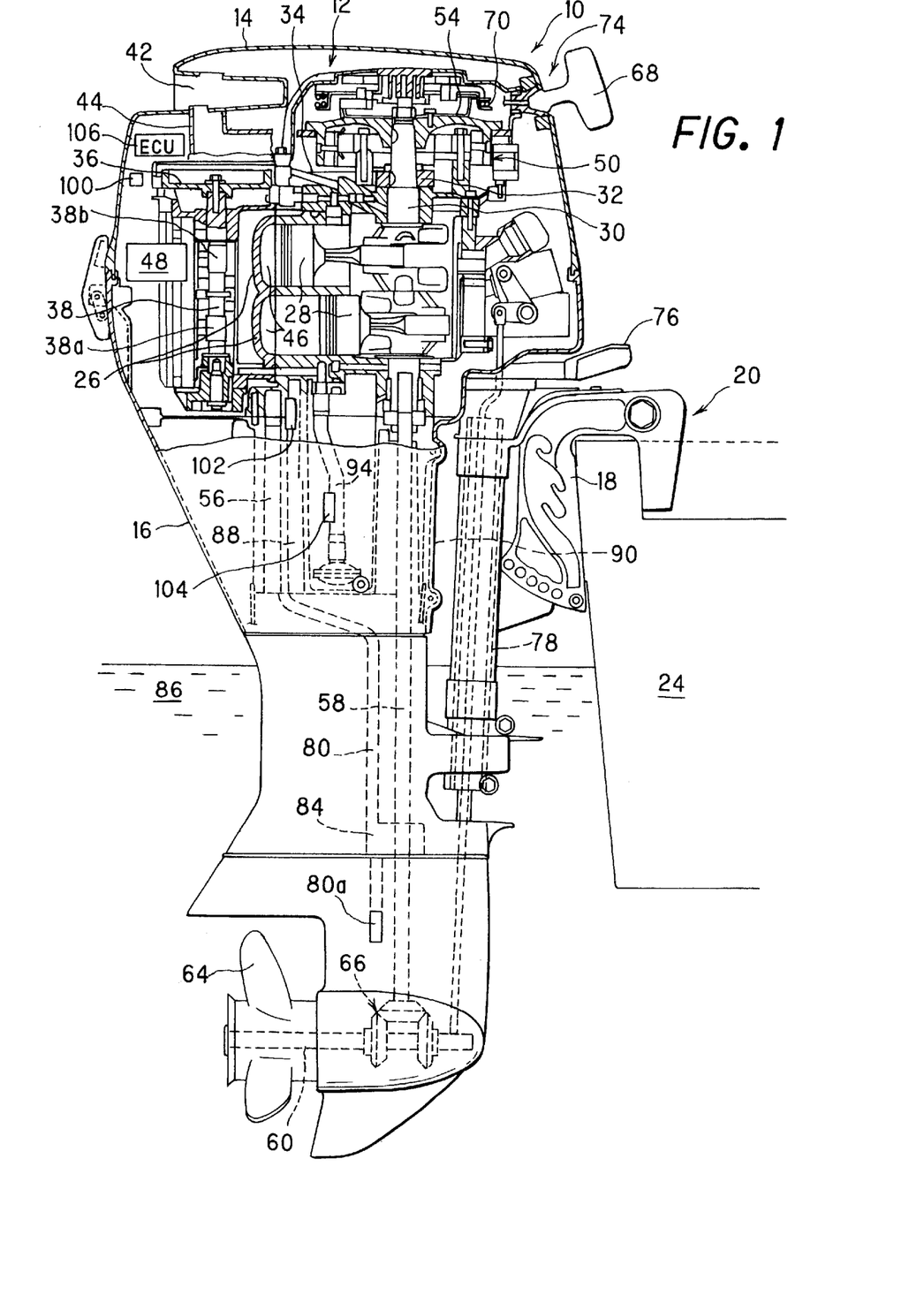
FIG. 1 is a schematic side view showing the overall configuration of an engine ignition timing control system for outboard motors according to an embodiment of this invention.

FIG. 1 is a schematic side view showing the overall configuration of the system.

In FIG. 1, the outboard motor (more generally boat propulsion unit) is designated by reference numeral 10. The outboard motor 10 is equipped with an internal combustion engine 12. The engine 12 is covered by an engine cover 14 that is fastened to an extension case 16. A clamp unit 20 comprising a bracket 18 is fastened to the extension case 16 and the outboard motor 10 is mounted on the stem of a boat 24 by clamping the bracket 18 onto a stern plate of the boat 24.

The engine 12 is a four-cycle, two-cylinder, spark-ignition, gasoline engine whose two cylinders 26, 26 are arranged one above the other. Pistons 28, 28 inserted into the cylinders 26, 26 to be movable therein are connected to a crankshaft 30 through piston rods. The crankshaft 30 is connected to a crank pulley 32, a timing belt 34, and through a cam pulley 36 to a camshaft 38.

A number of cams 38a, 38b, . . . equal to the number of cylinders (two in the illustrated embodiment) are mounted on the camshaft 38. The cams 38a, 38b, . . . operate through tappets, rocker arms or other such valve mechanisms (not shown) to open and close intake valves and exhaust valves (neither shown). Air drawn in through an air intake 42 and passing through an air intake pipe 44 has its flow rate regulated by a throttle valve (not shown) and enters a nearby a carburetor (not shown) where it atomizes gasoline (fuel). The resulting air-fuel mixture passes through an intake manifold (not shown) and into combustion chambers 46, 46 of the cylinders when the intake valves are open.

A decompression mechanism 48 of the type explained earlier is provided on the camshaft 38. As taught by Japanese Utility Model Publication No. Sho 63(1988)-2565, the decompression mechanism 48 is composed chiefly of a sickle-shaped weight (not shown) attached to the camshaft 38, a valve release member (not shown) attached to the weight that when in the operating position drives the intake/exhaust valves slightly in the opening direction, and a spring (biasing means; not shown) that biases the weight against the centrifugal force acting on the camshaft 38 so as to locate the valve release member in the operating position. When the rotational speed is slow enough for the spring to overcome the centrifugal force, the decompression mechanism makes the pistons easier to move and thus reduces the burden on the operator (recoil load).

An alternator 50 is installed on the crankshaft 30 above the crank pulley 32 and a flywheel 54 is provided at the upper end portion of the crankshaft 30. The flywheel 54 also functions as the rotor of the alternator 50, which generates alternating current when the crankshaft rotates.

The alternating current output of the alternator 50 is converted to direct current by an appropriate rectification circuit (not shown) and passed through an ignition coil (not shown). A high voltage produced in a secondary coil when the supply of current is stopped is sent through a distributor (not shown) to an ignition plug (not shown) to ignite air-fuel mixture in the associated combustion chamber 46. The air-fuel mixture burns explosively and drives the associated piston to rotate the crankshaft 30. The resulting exhaust gas passes to the exterior of the engine 12 through an exhaust pipe 56.

The lower end of the crankshaft 30 is connected to a drive shaft 58 that rotates a propeller 64 through a propeller shaft 60. The propeller shaft 60 is provided with a bevel gear-dog-clutch mechanism. When the operator operates a shift lever (not shown) located in the vicinity of the engine cover 14 to set the clutch position to forward or reverse, the propeller 64 rotates in the forward or reverse direction to propel the boat 24 forward or backward. When the operator sets the shift lever in neutral position, the transmission of rotation to the drive shaft 58 and the propeller shaft 60 is cut off.

The flywheel 54 is equipped with a recoil starter 74 comprising of a handle 68 and a rope 70. The operator starts the engine 12 by pulling the handle 68 to rotate the flywheel 54. After the engine 12 starts, the operator rotates a throttle grip 76 to regulate the throttle opening and thus regulate the speed of the boat in the forward or reverse direction. The throttle grip 76 also servers as a rudder handle. Specifically, it is connected to a swivel 78 to enable the operator to vary the direction of the propeller 64 by swinging the throttle grip 76 to the left or right.

A cooling water passage 80 used for cooling the engine 12 extends to near the propeller 64. The cooling water passage 80 is equipped midway thereof with a water pump 84 and at its lower end with a water intake 80a. The water pump 84 comprises a rubber impeller and is rotated by linkage with the drive shaft 58 to pump water from a lake (or sea) 86 and deliver it to a water jacket (not shown) formed around the engine 12. After circulating through the cooling jacket, the cooling water is returned to the lake 86 through a discharge passage 88.

An oil case 90 is installed in the engine 12 under the cylinders 26, 26 to serve as an oil pan for holding lubricating oil. The lubricating oil retained in the oil case 90 is pumped through a pipe 94 and delivered to the cylinders 26, 26 by an oil pump (not shown).

A pulser coil (magnetic pickup) 100 installed near the camshaft 38 outputs a pulse signal at 10 degrees BTDC (Before Top Dead Center) of each cylinder. A temperature sensor 102 installed at an appropriate location on the cooling water passage 80 outputs a signal proportional to the temperature of the cooling water passage 80, i.e. the temperature of the engine 12. An hydraulic switch 104 installed in the pipe 94 in the oil case 90 produces an OFF signal when the oil (hydraulic) pressure in the pipe 94 exceeds a prescribed value and an ON signal (alert signal) when it falls to or below the prescribed value.

The outputs of the pulser coil 100, temperature sensor 102 and hydraulic switch 104 are sent to an ECU (Electronic Control Unit) 106 constituted as a microcomputer. The ECU 106 is housed in an appropriate case and mounted under the engine cover 14. The operating power for the ECU 106 is obtained from the alternator 50 by dropping its rectified output to around dc 5 V.

Figure 2:
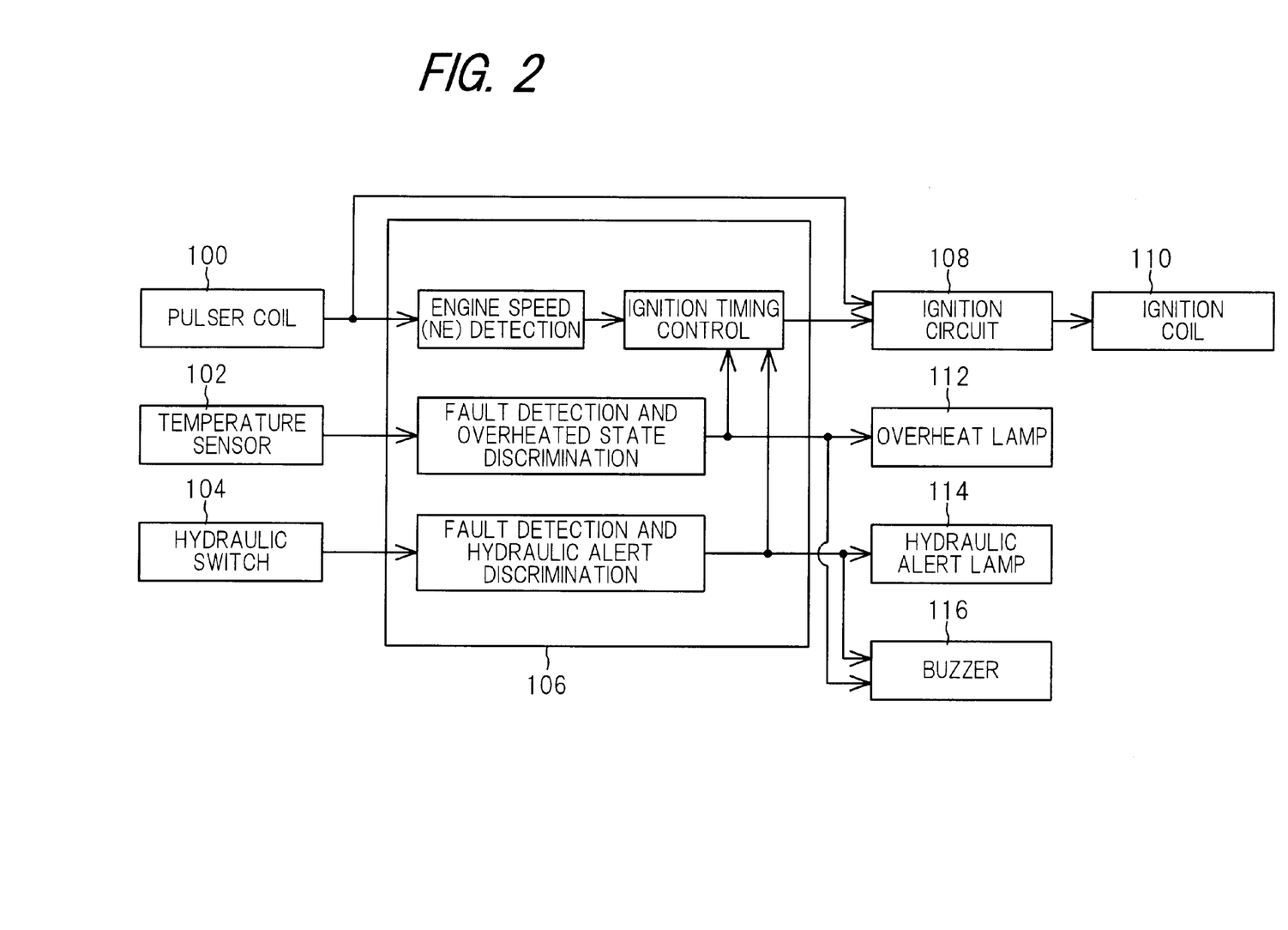
FIG. 2 is a block diagram functionally illustrating the configuration of an electronic control unit (ECU) of the system of FIG. 1.

FIG. 2 is a block diagram functionally illustrating the configuration of the ECU 106.

As illustrated, the ECU 106 uses the pulse signal received from the pulser coil 100 to detect the engine speed NE. The ECU 106 further utilizes the output signals from the temperature sensor 102 and the hydraulic switch 104 for fault detection and to discriminate whether the engine 12 is liable to fall into an overheated state or a low oil pressure (hydraulic alert) state. As explained in further detail below, the ECU 106 further uses the result of the detection and discrimination and the calculated engine speed NE to conduct ignition timing control, including ignition timing control at engine starting. Specifically, the ECU 106 controls an ignition circuit 108 (not shown in FIG. 1) so as to control current passed through an ignition coil 110 (not shown in FIG. 1).

In addition, when the ECU 106 determines that the engine 12 is liable to fall into an overheated state or a hydraulic alert state, it turns on an overheat lamp 112 or an oil pressure alert lamp 114 (neither shown in FIG. 1) and activates a buzzer 116.

The operation of the engine ignition timing control system for outboard motors according to this embodiment will now be explained. This operation is, in substance, the processing conducted by the ECU 106.

Figure 3:
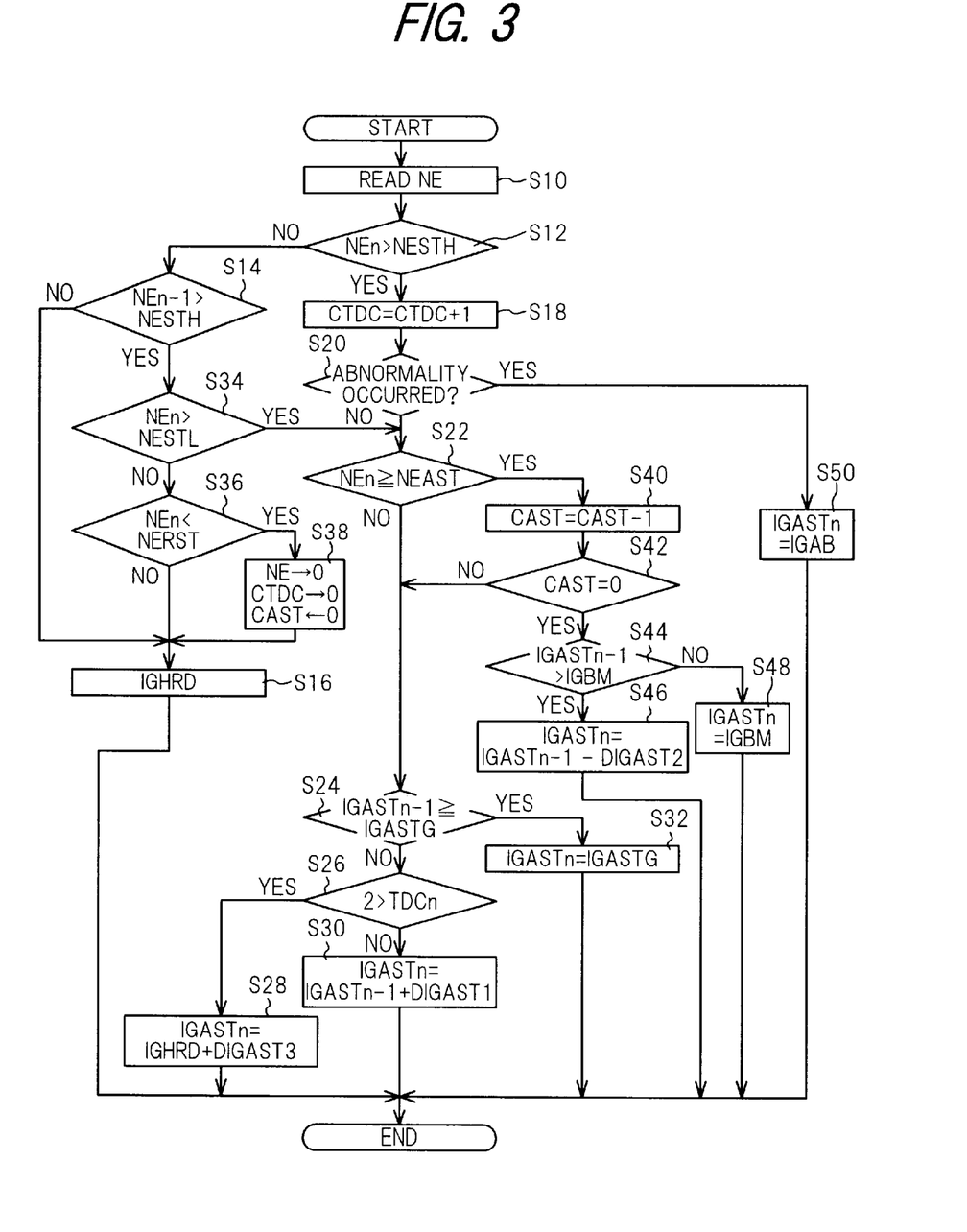
FIG. 3 is a flow chart showing the operation of the system of FIG. 1.

FIG. 3 is a flow chart showing the sequence of the processing operations conducted by the ECU 106. The program represented by the flow chart of FIG. 3 is activated by the pulse signals output by the pulser coil 100 at 10 degrees BTDC of the cylinders 26, 26.

The calculated engine speed NE is read in S10 and a check is then made in S12 as to whether the detected engine speed NEn exceeds a prescribed engine speed NESTH (a first prescribed engine speed; 600 rpm, for example).

In this specification and the drawings, the notation (n) indicates a sampling number in the discrete-data system, specifically, the value during the current sampling, still more specifically, the value during the current loop of the program of FIG. 3. The notation (n−1) used later indicates that the value is that in the preceding program loop.

Figure 4:
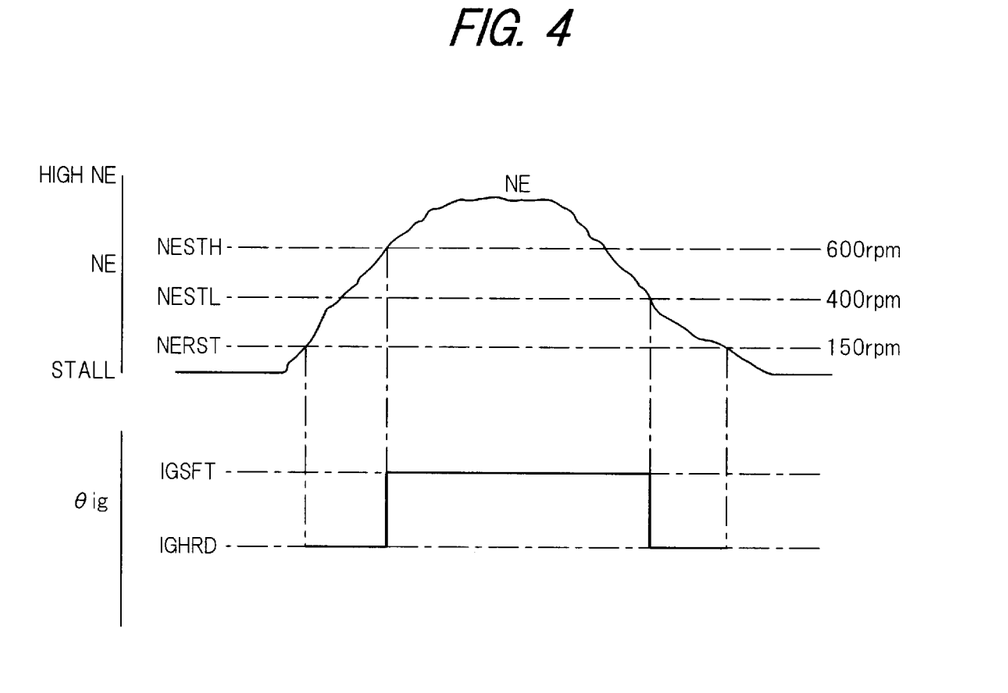
FIG. 4 is a time chart for explaining processing conducted in the flow chart of FIG. 3.

The processing conducted in the flow chart of FIG. 3 will now be explained with reference to the time charts of FIGS. 4 and 5.

In the system according to this embodiment, the ignition timing θig is set at a fixed crank angle (at 10 degrees BTDC, the time point at which the pulser coil 100 outputs a pulse signal) until the detected engine speed NE exceeds the prescribed engine speed NESTH. Ignition conducted at a fixed crank angle and the associated ignition timing control are herein referred to as "hardware ignition" or "IGHRD."

After the detected engine speed NE exceeds the prescribed engine speed NESTH, the ignition timing θig is controlled to a value (in terms of crank angle) looked up in a table (characteristic: not shown) predefining ignition timing as a function of engine speed NE, using the detected engine speed NE as address data. Ignition timing control using values retrieved from this table is hereinafter referred to as "software ignition" or "IGSFT" control.

More specifically, during starting of the engine 12 with the recoil starter 74, once the cranking produced by the operator's manual rotation of the crankshaft 30 has continued for a prescribed period, the alternator 50 starts to produce an output, and when the engine speed NE thereafter reaches a prescribed engine speed NESTL (e.g., 400 rpm), the ECU 106 goes into operation. The ignition timing is controlled to 10 degrees BTDC until the engine speed NE exceeds the prescribed engine speed NESTH. After the engine speed NE exceeds the prescribed engine speed NESTH, the ignition timing is controlled to IGBM obtained by retrieval from the table, which is compiled to increase the angle of ignition advance with increasing engine speed NE. As shown in FIG. 2, the output of the pulser coil 100 is also forwarded to the ignition circuit 108. Hardware ignition (IGHRD) based on the output of the ignition circuit 108 is conducted until the ECU 106 goes into operation.

As explained further later, after the engine speed NE has once exceeded the prescribed engine speed NESTH and software ignition has been implemented, software ignition is continued even if the engine speed NE thereafter falls below the prescribed engine speed NESTH, so long as engine speed NE remains above the prescribed engine speed NESTL. When the engine speed NE falls below a reset engine speed NERST (e.g., 150 rpm), the control is reset.

Next, in S12 of the flow chart of FIG. 3, when the result in S12 is NO, it is checked in S14 whether the detected engine speed NEn−1 in the preceding program loop exceeds the prescribed engine speed NESTH. When the result is NO, hardware ignition IGHRD is implemented in S16.

When the result in S12 is YES, a counter (up-counter) CTDC (initial value: 0) is incremented in S18. Next, in S20, it is checked whether the engine 12 is in the overheated state or the hydraulic alert state, i.e. it is checked whether abnormality has occurred in the engine 12. When the result is NO, it is checked in S22 whether the detected engine speed NEn in the current program loop is equal to or higher than a prescribed engine speed NEAST (a second prescribed engine speed; 900 rpm, for example).

Figure 5:
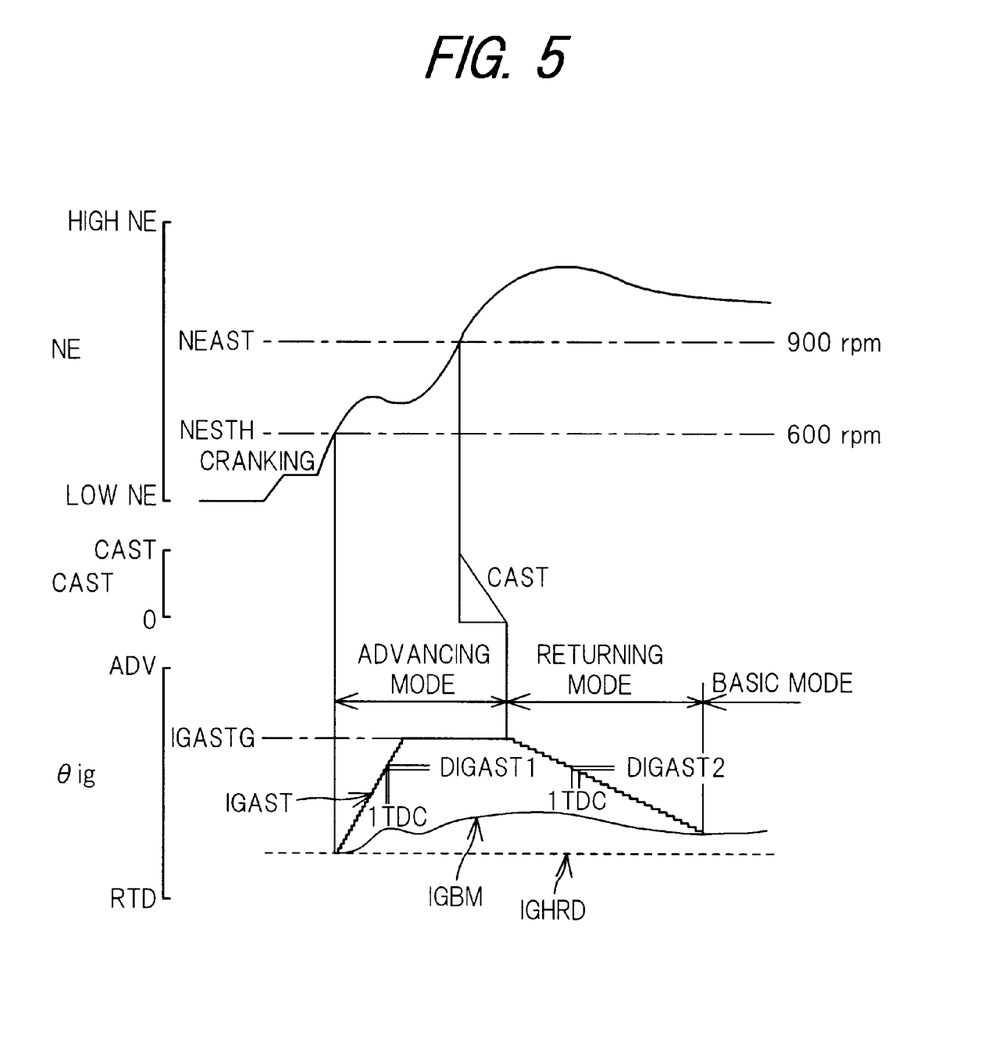
FIG. 5 is a time chart for explaining the processing conducted in the flow chart of FIG. 3.

As shown in FIG. 5, the prescribed engine speed NEAST is set at a higher value than the prescribed engine speed (software ignition implementation engine speed) NESTH, e.g., at 900 rpm. The prescribed engine speed NEAST is set to correspond to an engine speed known from tests carried out beforehand to be sufficient to enable the centrifugal force in the decompression mechanism 48 to overcome the biasing force of the spring and restore the valve release member to the non operating position.

When the result in S22 is NO, the program passes through S24 (explained later) to S26, in which it is checked whether the count value of a TDC (Top Dead Center) counter is less than 2. When the result is YES, the program goes to S28, in which the value obtained by adding a prescribed value DIGAST3 to the hardware ignition mode ignition timing IGHRD (10 degrees BTDC) is defined as the value of the software ignition mode ignition timing IGASTn in the current program loop.

In this specification and the drawings, an "addition" is an adjustment that increases the angle of ignition advance. The operation carried out in S28 is therefore an adjustment that advances the ignition timing by the amount of the prescribed value DIGAST3 from the hardware ignition mode ignition timing IGHRD (indicated by a broken line in FIG. 5). Conversely, a "substraction" is an adjustment that retards the ignition timing.

On the other hand, when the result in S26 is NO, the program goes to S30, in which the value obtained by adding a second prescribed value DIGAST1 to the software ignition mode ignition timing IGASTn−1 in the preceding program loop is defined as the value of the software ignition mode ignition timing IGASTn in the current program loop.

The relationship "prescribed value DIGAST3>second prescribed value DIGAST1" is defined. In other words, after the engine speed exceeds the prescribed engine speed NESTH, the amount of advance is made relatively large at only one TDC and thereafter the amount of advance is made small.

In S24, referred to in passing earlier, it is checked whether the software ignition mode ignition timing IGASTn−1 in the preceding program loop is equal to or greater than an upper limit value IGASTG. So long as the result is NO, the program passes through S26 to S30, in which, as shown in FIG. 5, the ignition timing is adjusted stepwise in the direction of advance. When the result in S24 is YES, the upper limit value IGASTG is defined as the value of the ignition timing IGASTn in the current program loop.

When a NO result in S12 is followed by a YES result in S14, the program goes to S34, in which it is checked whether the detected engine speed NEn in the current program loop exceeds the prescribed engine speed NESTL. When the result is YES, since the prescribed engine speed NESTH has once been exceeded, the program goes to S22 and the ensuing steps to switch to software ignition mode.

When the result in S34 is NO, it is checked in S36 whether the detected engine speed NEn in the current program loop is lower than the reset engine speed NERST. When the result is YES, the engine speed NE and the value of the TDC counter are set to zero in S38, and the program goes to S16. This implements the aforesaid resetting of the illustrated ignition timing control.

On the other hand, when the result in S22 is YES, the program goes to S40, in which the value (prescribed value) of a counter CAST is decremented to start down counting, and then to S42, in which it is checked whether the value of the counter CAST has reached zero, i.e., whether a prescribed time (value equivalent to CAST) has passed.

When the result in S42 is NO, the program goes to S24. When it is YES, the program goes to S44, in which it is checked whether the software ignition mode ignition timing IGASTn−1 in the preceding program loop exceeds the looked-up ignition timing IGBM (more precisely, whether it exceeds it in the advance direction).

When the result in S44 is YES, the program goes to S46, in which the value obtained by subtracting a third prescribed value DIGAST2 from the software ignition mode ignition timing IGASTn in the current program loop (effecting retard adjustment) is defined as the software ignition mode ignition timing IGASTn in the current program loop.

This processing is repeated every time the program is activated so long as the result in S44 remains YES. When the result in S44 becomes NO, i.e., when it is found that the ignition timing θig has returned to the looked-up ignition timing IGBM, the software ignition mode ignition timing is defined as the looked-up ignition timing IGBM.

In other words, as shown in FIG. 5, starting from a time point when a prescribed period CAST has passed since the engine speed NE exceeded the prescribed engine speed NEAST, the ignition timing adjusted in the advance direction is repeatedly adjusted stepwise in the retard direction until it is restored to the looked-up ignition timing IGBM. The relationship "third prescribed value DIGAST2>second prescribed value DIGAST1" is defined. For example, the second prescribed value DIGAST1 is defined as 1.5 degrees and the third prescribed value DIGAST2 as 3 degrees. In other words, retard adjustment is effected more rapidly than advance adjustment.

When the result in S20 is YES, the advance adjustment (or retard adjustment) is discontinued and the program goes to S50, in which the ignition timing is set to an abnormality ignition timing IGAB appropriately set on the retard side. In other words, the ignition timing θig is retarded to lower the engine speed NE without stopping the engine 12.

As explained in the foregoing, the system according to this embodiment is configured so that when the engine 12 is started, it is first operated in the hardware ignition mode after cranking and, then, when the engine speed NE has risen to a certain level (NESTH), is switched to the software ignition mode in which ignition advance adjustment is conducted. The engine speed NE can therefore be reliably brought up to the decompression disable engine speed (NEAST).

Engine output basically improves when the ignition timing is brought closer to the trace knock region (region in which sporadic weak knock occurs) on the ignition advance side and, by the ignition advance adjustment of this embodiment, the engine speed NE can be reliably increased to the decompression disable engine speed (NEAST). Although the ignition timing obtained by the ignition advance adjustment (IGAST) is made to approach the trace knock region, it is prevented from entering the strong knock region by defining the empirically determined upper limit value IGASTG.

The ignition timing control according to this embodiment therefore improves the engine starting performance without need for the prior art measures of installing a start throttle opener or markedly enriching the air-fuel ratio at engine starting.

Since provision of a start throttle opener is unnecessary, increased structural complexity and higher cost are avoided and no lowering of space utilization arises. Moreover, as compared with the case of markedly increasing the air-fuel ratio at engine starting, the CO concentration of the exhaust gas during idling can be reduced to ⅕ and the idling fluctuation can be reduced from ±50 rpm to ±30 rpm.

Further, the fact that the ignition advance adjustment produces a transient sharp increase in engine speed NE enables the operator to readily perceive that the engine 12 has started and, as such, improves operability.

In addition, the transition from hardware mode ignition timing to the fundamental software mode ignition timing utilizing the looked-up ignition timing IGBM can be smoothly achieved because the ignition advance adjustment is carried out stepwise starting from the hardware ignition timing IGHRD in hardware ignition mode and, once the engine speed NE reaches or exceeds the decompression disable engine speed NEAST, the ignition timing is returned stepwise toward the basic or fundamental looked-up ignition timing IGBM.

Furthermore, the engine speed NE rises steadily at engine starting because once the engine speed NE reaches or exceeds the decompression disable engine speed NEAST, the return of the ignition timing toward the basic or fundamental looked-up ignition timing IGBM is conducted stepwise after the passage of a prescribed period CAST.

The embodiment is thus configured to have a system for controlling ignition timing for an internal combustion engine 12, at starting, of an outboard motor 10 having a propeller 64 connected to the engine to be rotated, the outboard motor being to be mounted on a boat 24 such that the boat is propelled forward or backward, comprising: engine speed detecting means (pulser coil 100, ECU 106, S10) for detecting speed of the engine (engine speed NE); ignition timing setting means (ECU 106, S12-S48) for setting the ignition timing θig of the engine to a predetermined crank angle (IGHARD, 10 degrees BTDC) until the detected engine speed NE exceeds a first prescribed engine speed NESTH, and for setting the ignition timing of the engine to a value (IGBM) obtained by retrieving a predetermined characteristic (table) by at least the detected engine speed after the detected engine speed exceeds the first prescribed engine speed; ignition timing adjusting means (ECU 106, S22-S32) for adjusting the ignition timing in a direction advanced than the retrieved value until the detected engine speed NE becomes equal to or greater than a second prescribed speed NEAST after the detected engine speed has exceeded the first prescribed engine speed; and ignition means (ECU 106, ignition circuit 108, ignition coil 110) for igniting air-fuel mixture in the engine based on at least one of the set ignition timing and the adjusted ignition timing.

In the first aspect of the invention, until the detected engine speed reaches and exceeds the second prescribed engine speed, the ignition timing is adjusted to a value farther in the advance direction than that obtained for the detected engine speed by retrieval from a predefined characteristic (table). The engine speed can therefore be reliably increased at starting.

This is because engine output basically improves the closer the ignition timing approaches the trace knock region (region in which sporadic weak knock occurs) on the ignition advance side and the engine speed NE can therefore be reliably increased by the ignition advance adjustment.

This makes it possible to improve the starting performance of the engine by controlling the ignition timing and eliminates the need for the prior art measures of installing a start throttle opener or markedly enriching the air-fuel ratio markedly at engine starting. In addition, the fact that the ignition advance adjustment produces a transient sharp increase in engine speed NE enables the operator to readily perceive that the engine 12 has started and, as such, improves operability.

In the system, the ignition timing adjusting means adjusts the ignition timing in the direction of advance stepwise by a first unit amount until the adjusted ignition becomes equal to or greater than un upper limit value IGASTG; S24-S32).

In the second aspect of the invention, the ignition timing is advanced up to a prescribed upper limit. The ignition timing can therefore be prevented from advancing beyond the trace knock region into the strong knock region and, by conducting the advance adjustment in a stepwise manner, the ignition timing can be smoothly regulated.

In the system, the ignition timing adjusting means adjusts the ignition timing in a direction of retard toward the retrieved value after the detected engine speed becomes equal to or greater than the second prescribed engine speed. Specifically, the ignition timing adjusting means adjusts the ignition timing in the direction of retard toward the retrieved value when a prescribed time (value corresponding to CAST) has passed after the detected engine speed became equal to or greater than the second predetermined engine speed (S22, S40-S46). More specifically, the ignition timing adjusting means adjusts the ignition timing in the direction of retard toward the retrieved value stepwise by a second unit amount after the prescribed time has passed after the detected engine speed became equal to or greater than the second predetermined engine speed.

In the third aspect of the invention, when a prescribed period has passed after the detected engine speed reaches and exceeds the second prescribed engine speed, the ignition timing is adjusted stepwise in the retard direction toward the looked-up value. The ignition timing can therefore be smoothly moved to the looked-up value while steadily increasing the engine speed.

The system further includes; a decompression mechanism 48 composed of a weight attached to a shaft (camshaft) 12 of the engine, a valve release member attached to the weight that, when in an operating position, drives intake and exhaust valves in an opening direction and a biasing means that biases the weight against centrifugal force acting on the shaft so as to locate the valve release member in an operating position; and wherein the second prescribed engine speed NEAST is determined to be corresponding to an engine speed enable to overcome biasing of the biasing means and to restore the valve release member to a non-operating position.

In the fourth aspect of the invention, the system is equipped with a decompression mechanism and the second prescribed engine speed is set to an engine speed sufficient to overcome the force of the biasing means of the decompression mechanism and remove the valve release member from the operating position. The aforesaid effects are therefore especially pronounced in a system for controlling the engine ignition timing control system for outboard motors equipped with a decompression mechanism.

The system further includes: a recoil starter 74 attached to a flywheel 54 of the engine 12; and wherein the engine is started by the recoil starter.

In the fifth aspect of the invention, the system is equipped with a recoil starter attached to the flywheel. The aforesaid effects are therefore especially pronounced in an engine ignition timing control system for an outboard motors equipped with a recoil starter.

The system further includes: engine abnormality detecting mans (temperature sensor 102, hydraulic switch 104, ECU 106) for detecting whether abnormality has occurred in the engine based on at least one of a temperature of the engine and a pressure of lubricant oil delivered to the engine; and wherein the ignition timing adjusting means discontinues to adjust the ignition timing in the direction of advance when the abnormality has occurred in the engine (S20, S50).

In the sixth aspect of the invention, the aforesaid effects are obtained and, in addition, the ignition advance adjustment is discontinued when an abnormal engine condition detected. An abnormal state of the engine can therefore be promptly dealt with.

Although the invention was described in the foregoing with respect to an embodiment taking an outboard motor engine equipped with a decompression mechanism as an example, the invention is also capable of increasing the output torque at starting, and thus the starting reliability, of an outboard motor engine not equipped with a decompression mechanism.

Although the invention was described with respect to an embodiment taking an outboard motor as an example, it is not limited in application to an outboard motor but can also be applied with good effect to an inboard motor.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling ignition timing for an internal combustion engine, at starting, of an outboard motor having a propeller connected to the engine to be rotated, the outboard motor being to be mounted on a boat such that the boat is propelled forward or backward, comprising:

engine speed detecting means for detecting speed of the engine;

ignition timing setting means for setting the ignition timing of the engine to a predetermined crank angle until the detected engine speed exceeds a first prescribed engine speed, and for setting the ignition timing of the engine to a value obtained by retrieving a predetermined characteristic by at least the detected engine speed after the detected engine speed exceeds the first prescribed engine speed;

ignition timing adjusting means for adjusting the ignition timing in a direction advanced than the retrieved value until the detected engine speed becomes equal to or greater than a second prescribed speed after the detected engine speed has exceeded the first prescribed engine speed; and ignition means for igniting air-fuel mixture in the engine based on at least one of the set ignition timing and the adjusted ignition timing.

2. A system according to claim 1, wherein the ignition timing adjusting means adjusts the ignition timing in the direction of advance stepwise by a first unit amount until the adjusted ignition becomes equal to or greater than un upper limit value.

3. A system according to claim 2, wherein the ignition timing adjusting means adjusts the ignition timing in a direction of retard toward the retrieved value after the detected engine speed becomes equal to or greater than the second prescribed engine speed.

4. A system according to claim 3, wherein the ignition timing adjusting means adjusts the ignition timing in the direction of retard toward the retrieved value when a prescribed time has passed after the detected engine speed became equal to or greater than the second predetermined engine speed.

5. A system according to claim 4, wherein the ignition timing adjusting means adjusts the ignition timing in the direction of retard toward the retrieved value stepwise by a second unit amount after the prescribed time has passed after the detected engine speed became equal to or greater than the second predetermined engine speed.

6. A system according to claim 1, further including;

a decompression mechanism composed of a weight attached to a shaft of the engine, a valve release member attached to the weight that, when in an operating position, drives intake and exhaust valves in an opening direction and a biasing means that biases the weight against centrifugal force acting on the shaft so as to locate the valve release member in an operating position;

and wherein the second prescribed engine speed is determined to be corresponding to an engine speed enable to overcome biasing of the biasing means and to restore the valve release member to a non-operating position.

7. A system according to claim 3, further including;

a decompression mechanism composed of a weight attached to a shaft of the engine, a valve release member attached to the weight that, when in an operating position, drives intake and exhaust valves in an opening direction and a biasing means that biases the weight against centrifugal force acting on the shaft so as to locate the valve release member in an operating position;

and wherein the second prescribed engine speed is determined to be corresponding to an engine speed enable to overcome biasing of the biasing means and to restore the valve release member to a non-operating position.

8. A system according to claim 1, further including:

a recoil starter attached to a flywheel of the engine;

and wherein the engine is started by the recoil starter.

9. A system according to claim 3, further including:

a recoil starter attached to a flywheel of the engine;

and wherein the engine is started by the recoil starter.

10. A system according to claim 1, further including:

engine abnormality detecting mans for detecting whether abnormality has occurred in the engine based on at least one of a temperature of the engine and a pressure of lubricant oil delivered to the engine;

and wherein the ignition timing adjusting means discontinues to adjust the ignition timing in the direction of advance when the abnormality has occurred in the engine.

11. A system according to claim 3, further including:

engine abnormality detecting mans for detecting whether abnormality has occurred in the engine based on at least one of a temperature of the engine and a pressure of lubricant oil delivered to the engine;

and wherein the ignition timing adjusting means discontinues to adjust the ignition timing in the direction of advance when the abnormality has occurred in the engine.

* * * * *